UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 320,400, dated June 16, 1885.

Application filed May 18, 1885. (No specimens.)

*To all whom it may concern:*

Be it known that I, JOHN C. SCHUMAN, of Akron, in the county of Erie and State of New York, have invented a new and useful Improvement in the Manufacture of Starch, of which the following is a specification.

This invention relates to an improvement in the ordinary method of extracting crude starch from Indian corn or maize, and has the object to simplify the process and the apparatus employed in carrying out the process, and to produce at small expense a crude starch which can be advantageously employed for various industrial purposes.

In practicing my invention the corn is first steeped in a suitable vat or tank, which is provided with a perforated false bottom for draining, at a temperature of about 140° Fahrenheit, for about fifteen hours, and this temperature is maintained in the steep-tank by renewing the water from time to time from a tank containing hot water. The temperature is preferably not allowed to rise to 155° Fahrenheit, as it would cause the starch-cells to burst and render the subsequent recovery of the starch difficult, if not impossible. When the steeping is completed, the kernels of corn have become expanded, swelled, and softened by the combined action of the heat and moisture, and the hulls and germs tend to separate from the starchy portions of the kernels, so that these component parts of the kernels are only loosely held together and in a condition in which they can be partially detached from each other by the following process: The warm water is now drawn from the steep, and cold water is introduced into the same, whereby the corn is cooled or chilled. This not only presents the corn to the subsequent operation of reduction in a cold state, but also tends to toughen the hulls and germs, and renders them less liable to become finely pulverized in reducing the kernels. The water is next drained thoroughly from the corn in the steep-vat, a period of from four to six hours being usually allowed for this purpose. The steeped corn, after having been thoroughly drained, is next reduced in a suitable mill, which is preferably a disk-mill, in which one disk has a slight eccentric movement with reference to the other, and which is known as the Bogardus mill; or, if preferred, a roller mill or other reduction-machine whereby the corn is coarsely ground or crushed may be employed for this purpose. By this machine the corn is coarsely ground or reduced, whereby the hulls and germs are to a large extent detached from the starchy portions of the kernels in comparatively large fragments, while the starchy portions are more finely reduced, so that a large proportion of the starch can be separated from the fragments of hulls and broken germs. This is accomplished by a suitable vibrating or rolling screen, which is so clothed that the starch passes through the meshes of the screen, while the hulls and broken germs tail off together; or, if desired, the reduced material may be divided by the screen into a number of different products of different degrees of fineness, the finest product being crude starch, while the coarser products consist of fragments of hulls and broken germs containing a greater or less admixture of starch. The crude starch so obtained is comparatively free from impurities, and may now be further treated as may be necessary to produce the desired ultimate product; or, if not required for immediate use, it may be dried. The reduced material, as it comes from the reducing-machine, still contains some of the moisture which it has absorbed in the steep, and the starch-meal and other products of the separation are therefore slightly moist; but this material can be easily deprived of this moisture by passing each product through a suitable drier. When so dried, the starch-meal or crude starch forms an article of commerce which can be stored for long periods of time and be shipped to distant places of consumption without deteriorating, and the offal can be treated in a like manner, and forms a desirable food for cattle, while the fragments of germs, if collected separately, can be pressed to extract the oil, and the oil-cakes can be used as cattle-feed.

The crude starch may be subjected to a second reducing operation when it is desired to reduce the crude starch to a greater degree of fineness. The tailings or coarse products may also be reduced again for the purpose of further detaching the remaining starch from the fragments of hulls and broken germs, and this detached starch may be recovered by a second sifting operation.

I claim as my invention—

The herein-described method of extracting crude starch from Indian corn or maize, which consists in first steeping the corn, then thoroughly draining the corn, then coarsely grinding or crushing the corn, and then separating the crude starch from the coarse offal by sifting, substantially as set forth.

Witness my hand this 15th day of May, 1885.

JOHN C. SCHUMAN.

Witnesses:
 WM. H. CARR,
 W. ELMORE.